May 22, 1951 R. BRÜGGER 2,553,808
MACHINE FOR THE AUTOMATIC APPLICATION OF UNPIERCED
BEARING STONES TO CARRIER MEMBERS
Filed Sept. 1, 1948 6 Sheets-Sheet 1

INVENTOR.
RUDOLF BRÜGGER
BY
K. B. Mayr
ATTORNEY.

May 22, 1951  R. BRÜGGER  2,553,808
MACHINE FOR THE AUTOMATIC APPLICATION OF UNPIERCED
BEARING STONES TO CARRIER MEMBERS
Filed Sept. 1, 1948  6 Sheets-Sheet 2

INVENTOR.
RUDOLF BRÜGGER.
BY
ATTORNEY.

Patented May 22, 1951

2,553,808

UNITED STATES PATENT OFFICE 2,553,808

MACHINE FOR THE AUTOMATIC APPLICATION OF UNPIERCED BEARING STONES TO CARRIER MEMBERS

Rudolf Brügger, Frutigen, Switzerland, assignor to Uhrensteinfabrik Brugger & Cie, Frutigen, Switzerland, a company of Switzerland Application September 1, 1948, Serial No. 47,216
In Switzerland April 21, 1947

13 Claims. (Cl. 51—277)

This invention relates to a machine for the automatic application of unpierced bearing stones to carrier members, such as pins which in the art often are designated by the French term "coulants."

The machine according to the invention is characterised by a guide for receiving and guiding a plurality of carrier members moved gradually in the said guide at first into reach of a means for applying an adhesive substance to one end face of the carrier members or "coulants," and then into reach of a stone feeder taking stones from a magazine one after another and afterwards pressing them against carrier members held in a holder opposite to the stone feeder.

Other objects and features will be apparent as the following description proceeds, reference being had to the accompanying drawings, illustrating by way of example an embodiment of the invention, and wherein Fig. 17 is a horizontal section along the line XVII—XVII of Fig. 16, Fig. 18 shows a part of the stone magazine, on a larger scale, Fig. 19 is a horizontal section along the line XIX—XIX of Fig. 18, Figs. 20, 21 and 22 show the drive mechanism of the stone magazine in different positions.

Figure 1:
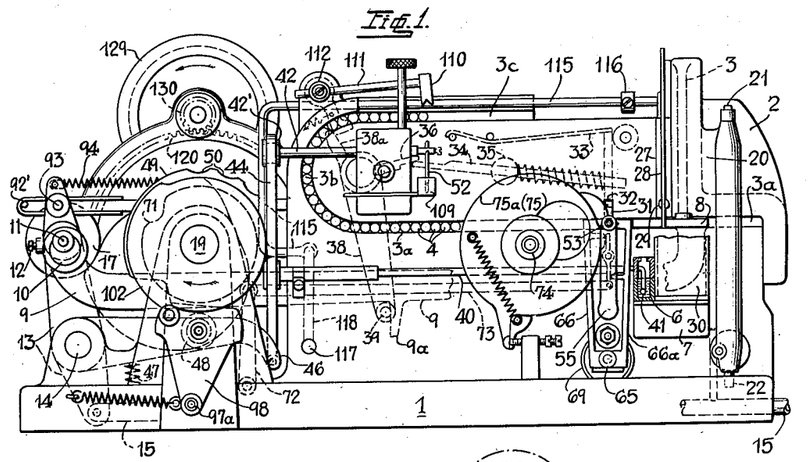
Fig. 1 is a side elevation of the machine.
Figure 9:
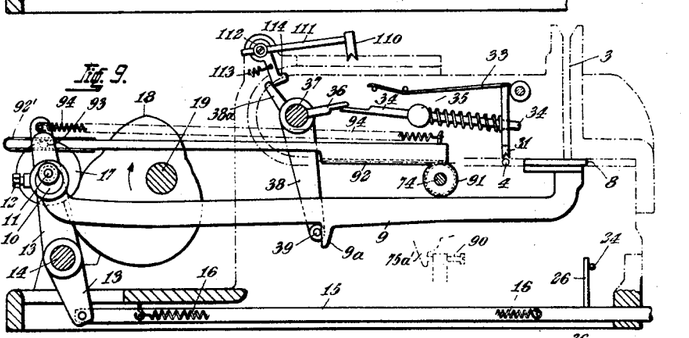
Fig. 9 is a view of a drive mechanism for different conveying and holding means.

Referring now to the drawings, the stone-applying machine has a rectangular base plate 1 with a box-shaped body 2 thereon, having two parallel longitudinal walls. In this body 2 there is provided a guide comprising a vertical feed channel 3, a horizontal slide part 3a, a curved part 3b and a horizontal outlet part 3c for cylindrical carrier pins 4 or "coulants" (Fig. 6b) carrying unpierced bearing stones such as watch stones, for instance. These pins have two flat recesses 4' on the upper end in Fig. 6b, the lower end face serving to receive a bearing stone 5 which is to be pierced on a drilling machine. These disc-shaped, unpierced stones are fixed to the end face of the pins 4 by means of a quick setting adhesive substance which is stored in an oblong, narrow container 6 detachably mounted on a girder 7 at the one end of the body 2. The means for applying adhesive substance to the end face of the pins 4 and its drive mechanism are described later on. At the right end of the horizontal slide part 3a of the guide, there is provided a reciprocating slidable pusher member or slide plate 8 (Figs. 1 and 9) fixed to the one end of a rod 9 whose other end engages an eccentric 10 attached to an axle 11 by means of a set screw 12 which may be released to allow angular adjustment of the eccentric on the axle 11. This adjustment allows the position of the slide plate 8 in the part 3a to be altered. The axle 11 is arranged on a double-armed lever 13 rotatably mounted on a horizontal axle 14 and articulated to a rod 15 guided on the base plate 1 (Figs. 1 and 9). A spring 16 fixed to the baseplate and to the rod 15 presses a roller 17 rotatably mounted on the axle 11 against a cam disc 18 fixed to the main drive shaft 19.

Figures 10, 11, 12, 13, 14:
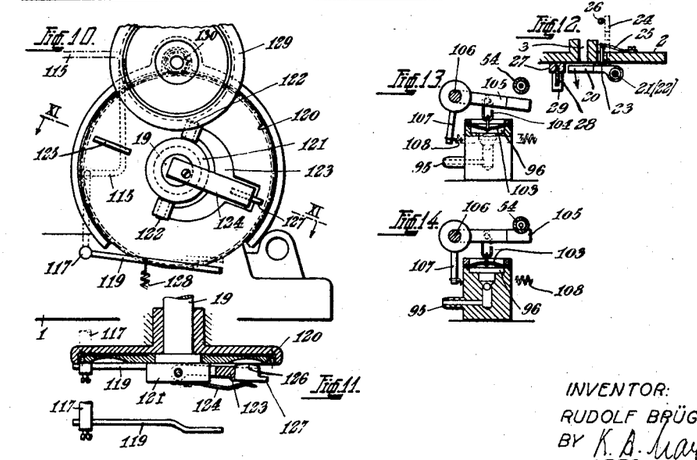
Fig. 10 is an elevation of a coupling device.
Fig. 11 is a section along the line XI—XI of Fig. 10.
Fig. 12 is a horizontal section of a detail.
Figs. 13 and 14 are sections along the line XIII—XIV of Fig. 2, Figs. 15 and 16 are views of the stone magazine.

The one lateral end of the feed channel 3 is temporarily closed by an oscillating flap 20 rotatably arranged by vertical pins 21 and 22. This flap 20 carries two pins 23 and 24 (Fig. 12). A plate spring 25 pressing upon the pin 23 holds the flap 20 at a small distance from the longitudinal side face of the side wall of the body 2. A pin 26 fixed to the rod 15 (Fig. 9) extending within reach of the pin 24 presses the flap 20 onto the side wall of the body 2 when the rod 15 moves backwards in Fig. 9, so that the pins 4 in the feed channel 3 become flush with the side wall of the body 2, and are at the same time pressed against the stop 8a. Now, when the lowermost pin 4 in the channel 3 is advanced by the slide plate 8, this pin 4 slides along the inclined surface 8b and is thereby pushed axially (towards the bottom in Fig. 2) until its end face is flush with the side face of the slide plate 8 (the lower face in Fig. 2), while the pierced bearing stone fixed to the end face of pin 4 projects laterally beyond the slide plate 8 by an amount equal to its thickness. Adjacent to the flap 20 there is a guide 27 for a stripper 28 which strips the pierced stones off the pins 4 moved along the stripper by the slide plate 8. On its lower part, the stripper 28 is held in a pin 29 so that the lower stripper end projects beyond this pin 29. The stripper is so dimensioned that its projecting lower end will break when a pin 4 strikes against the stripper or a bearing stone adheres so firmly that the pin end carrying the stone would otherwise be damaged. Preferably, the stripper is so dimensioned that the pins 4 pushed axially by the inclined surface 8b strikes by its end face against the inner edge of the stripper but only with the face-part lying around the stone fixed to this face. The bearing stones stripped off drop into a container 30 resting on the girder 7.

Figures 23, 24, 25, 26, 27:
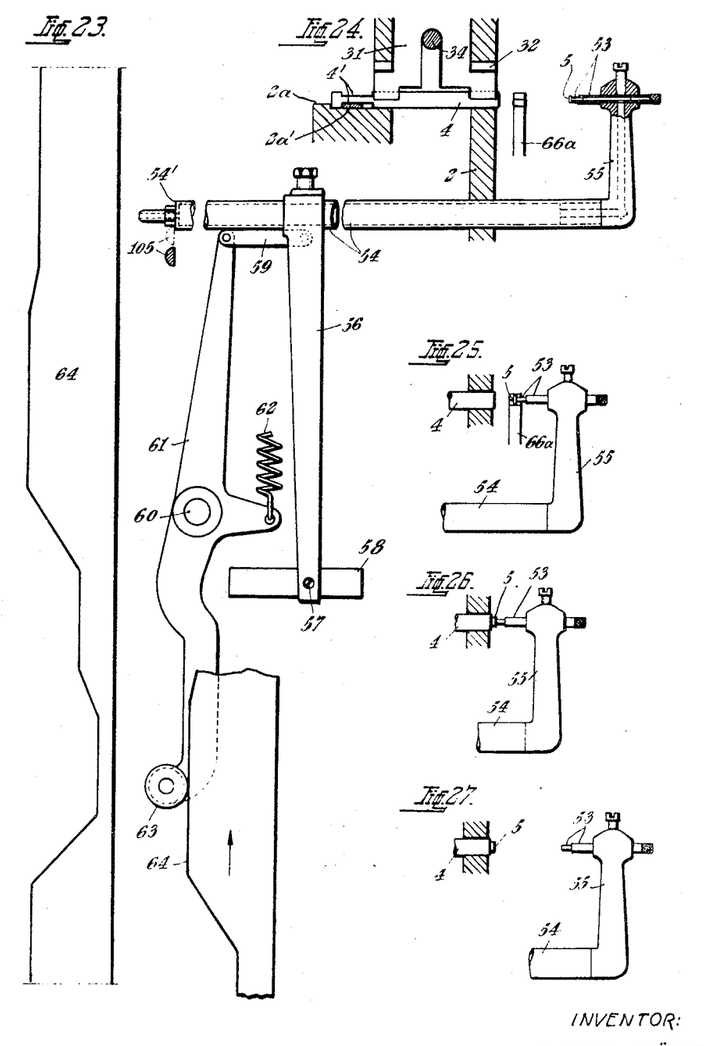
Figs. 23–27 illustrate details on a larger scale.

At a certain distance from the stripper 28 onwards a fork-like up- and downwardly movable holder or arrester 31 for the pins 4 is slidably guided in a vertical slot 32 of the body 2 (Fig. 24). This holder 31 is permanently pressed downwards by a leaf spring 33 and its up- and down-movement is controlled by a lever 34 by which it is engaged (Fig. 9). This lever 34 is rotatably mounted on an axle 35 and extends within reach of an arm 36 of a shaft 37 carrying a double-armed lever 38, 38a. Arm 38 has a lateral pin 39 projecting within reach of a downwardly extending nose 9a of the rod 9. By means of this nose, the holder 31 on a forward movement of the rod 9 and the plate 8 (to the left in Fig. 9) is moved upwards through the intermediary of the parts 39, 38, 37, 36, 34, so that the pin 4 held by the holder 31 on the guide part 3a is released.

Figures 7, 8, 8A, 8B:
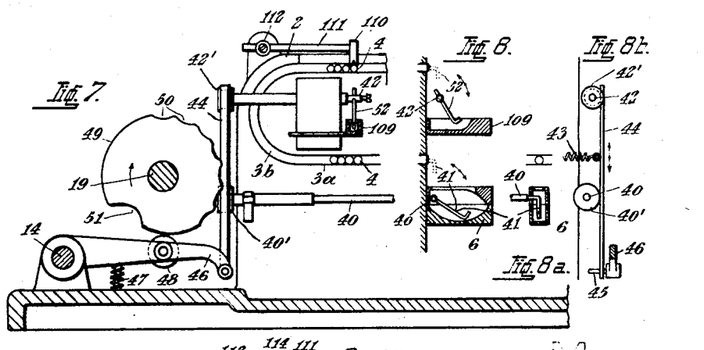
Fig. 7 is a view of the drive mechanism of a means for applying grinding material to the stones and of a means for applying an adhesive substance to the carrier pins.
Fig. 8 is an elevation showing in its upper part the grinding material-applying device, and in its lower part the adhesive substance-applying device.
Fig. 8a is a cross section through the latter.
Fig. 8b is an elevation of the drive mechanism of the grinding material-applying means and of the adhesive substance-applying means.

Before this holder 31, there is a finger 41 in a container 6 with an adhesive substance therein. This finger 41 is fixed to a horizontal shaft 40 (Fig. 8) and, on being swung upwards by the shaft 40 contacts the end face of a pin 4 and applies a very small quantity of adhesive substance thereto. This position of the finger 41 is shown in dotted lines in Fig. 8. Shaft 40 and another shaft 42 arranged above the former, driving a finger 52 applying a grinding dust to the stones, carry rollers 40' and 42' respectively in engagement with a friction bar 44 pressed against them by a spring 43 (Figs. 7 and 8b). This bar 44 is coupled with the lever 46 by means of a pin 45 so that it may be oscillated by the lever 46. The latter is loosely mounted on the axle 14 and carries a roller 48 which is pressed by a spring 47 against a cam disc 49 fixed to the shaft 19. This disc 49 comprises different small recesses 50 and a large recess 51. On rotation of the disc 49, the recesses 50 cause a quick oscillation of the lever 46 moving the friction bar 44 up and down so that the rollers 40' and 42' with their shafts 40 and 42 are swung to and fro. Thereby, also the finger 41 oscillates so that the liquid adhesive substance in the container 6 is being shaken and its setting retarded. If the roller 48 enters the recess 51, lever 46 and the friction bar 44 move upwards until the fingers 41 and 52 mounted on the shafts 40 and 42 contact pins 4 lying in reach of them. The small quantity of adhesive substance transported by the finger 41 to the respective pin 4 is sufficient for adhering a bearing stone thereto.

Figure 2:
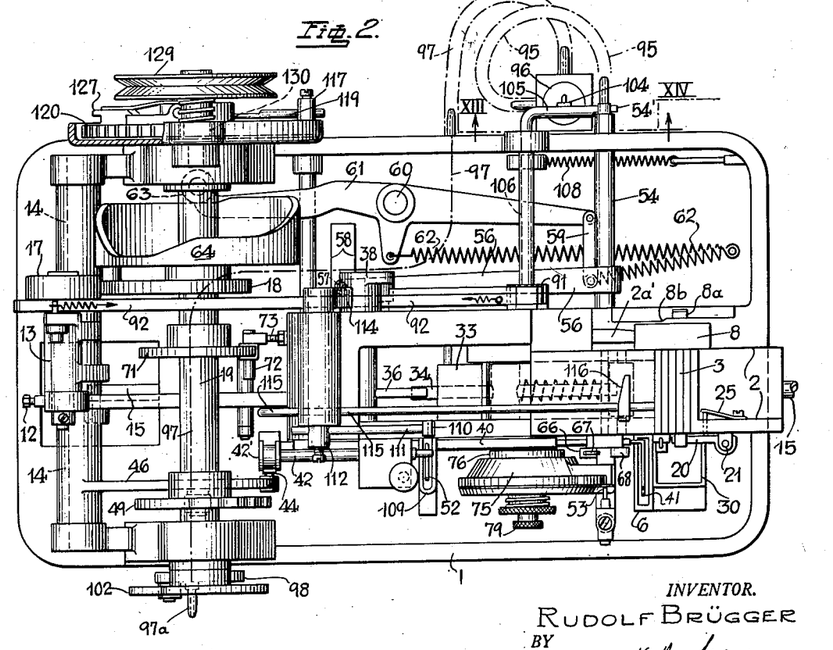
Fig. 2 is a top view thereof.
Figure 5:
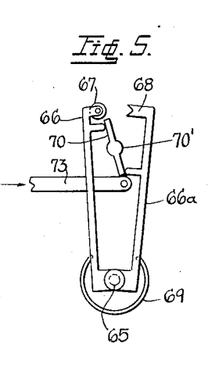
Fig. 5 is a view of the stone-centering device in open position.
Figure 6:
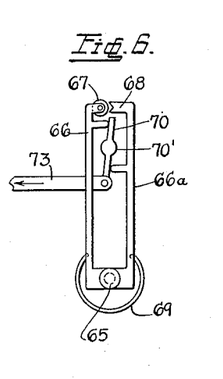
Fig. 6 shows the stone-centering device in closed position.
Figure 6A:
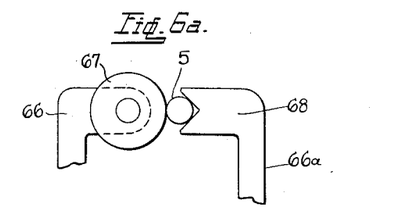
Fig. 6a illustrates a detail of the centering device, on a larger scale.
Figure 6B:
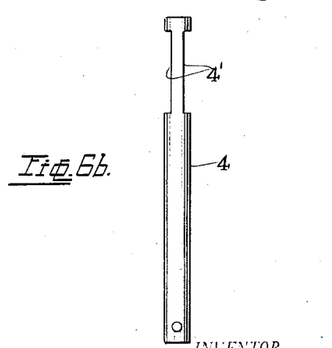
Fig. 6b is a side view of a stone-carrier pin or "coulant," on a larger scale.

In the median vertical longitudinal plane of the holder 31 and at the level of the guide part 3a and in front of the latter, a stone feeder or applicator in the form of a nozzle pipe 53 is provided in the head of a hollow arm 55 extending upwards from a horizontal tube 54 (Figs. 24-27). At the other side of the body 2 the tube 54 carries an arm 56 shown in a plan view in Fig. 24. An adjusting screw 57 on the free end of this arm 56 bears on a horizontal slide surface 58, allowing the arm 55 with the stone feeder 53 to be brought exactly into the vertical median plane of the pin 4 held by the holder 31. By means of a link 59, the arm 56 is coupled with the one end of a lever 61 which may be swung about a vertical pin 60. Lever 61 carries a roller 63 which is pressed by a spring 62 against a cam disc 64 fixed to the shaft 19 (Fig. 2). In the vertical median plane of the tube 54 lies the axis of a horizontal pin 65 on which two centering levers 66, 66a are rotatably mounted. At the level of the axis of the stone feeder 53 the lever 66 carries a roller 67 and the lever 66a a fork 68 with an angular cut-out forming an angle of 60°. The levers 66 and 66a on being swung towards each other clamp and center a bearing stone 5 held by suction effect on the feeder 53 exactly in alignment with the axis of the latter. An annular spring 69 tends to move the levers 66, 66a, which form the prongs of a clamp, towards each other, while by a double-armed lever 70 arranged between levers 66, 66a, cooperating with projections of the latter, the levers 66, 66a may be moved away from each other (Figs. 5 and 6). Lever 70 is controlled by a cam disc 71 fixed to the shaft 19 through the intermediary of a roller in engagement with the disc 71 and carried on a lever 72 and of a rod 73 articulated to lever 72 and to a lever (not shown) fixed to the axle of lever 70'.

Figures 15, 16, 17, 18, 19:
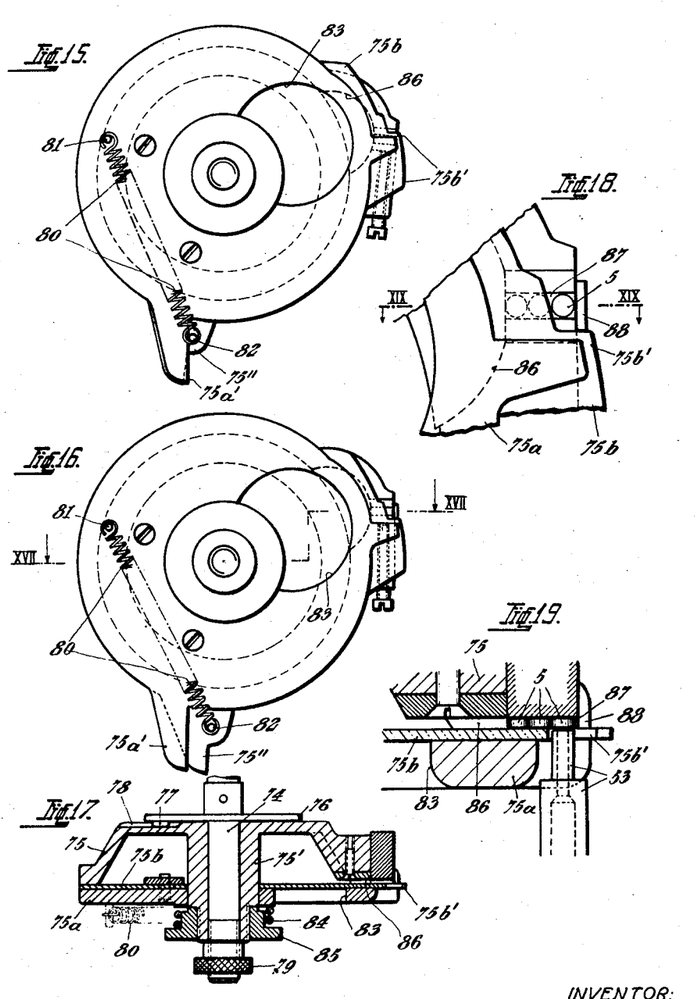

In order to receive a supply of unpierced bearing stones and for delivering them to the feeder 53, a magazine is provided on a shaft 74. This magazine is shown on a larger scale in Figs. 15 to 19 and comprises a cup-shaped, tapered part 75 and a part 75a closing the former. To the shaft 74 a disc 76 is fixed, comprising a nose 77 entering a groove 78 in the bottom of the magazine part 75 driving the latter on rotation of the shaft 74 (Fig. 17).

The magazine part 75 is pressed against the disc 76 by means of a nut 79 supported on the end face of a hub 75' of the part 75, penetrating the magazine part 75a. The latter part may be rotated within certain limits relative to the part 75. A helical spring 80 with its one end fixed to a pin 81 of the magazine part 75a and with the other end to a pin 82 of a nose 75'' of the part 75 presses a nose 75a' of the part 75a against the pin 82 (Fig. 15). The part 75a carries a transparent disc 75b, of Celluloid, e. g. turned towards the part 75 and closing a window 83 of the part 75a. This disc 75b projects over the parts 75, 75a on the right side of Figs. 15 to 19. The part 75a presses the disc 75b against the part 75 under the action of a spring 84 supported on a nut 85 screwed to the hub 75'. The end face of the part 75 adjacent to the disc 75b has a flat, semi-circular recess 86 serving as a primary adjuster for the stones, which is open towards the inside of the magazine and which continues into a channel 87. The depth of the recess 86 and of the channel 87 is but slightly larger than the thickness of the bearing stones 5 so that these latter in the recess and in the channel are adjusted into a plane and form a row in the channel 87 (Figs. 18 and 19). The outer end of the channel 87 is closed by a plate 88 preventing escape of the stones. The disc 75b has a radial extension 75b' projecting beyond the remaining parts of the magazine. This extension serves for closing the channel 87 laterally towards the part 75a when no stone is to be removed from the channel. During this period the magazine is in the positions shown in Figs. 16, 18, 20, where the channel 87 is horizontal so that the stones contained therein have no tendency of rolling outwards. For releasing the outermost stone in the channel 87 for being fed by the feeder 53, the two magazine parts 75, 75a are rotated with regard to each other so that the channel 87 is displaced to a position above the extension 75b'. The disc 75b is so shaped in radial and circumferential direction that in this position only the outermost stone is uncovered towards the side of the feeder 53, while the inner stones are still retained by the disc 75b. In order that the magazine parts may be turned with regard to each other when they are being moved to the position shown in Figs. 16, 18, 20, stop screws 89 and 90 (Figs. 20 and 22) are provided within reach of the noses 75'' and 75a', said screws being adjusted with regard to each other in such a way that the noses make contact with them one after another. At first, nose 75a' strikes against the stop 90, and then the nose 75'' against the stop 89 lying behind stop 90. On returning the magazine 75, 75a, at first the part 75 rotates until the pin 82 of the nose 75'' strikes against the nose 75a'. Afterwards, both magazine parts rotate together at the same speed from the position of Fig. 22 into the position shown in Fig. 21. On this rotation of the stone magazine the stones in the channel 87 move forward, and a new stone enters from the recess 86 into the channel 87. The supply in the magazine and the delivery of stones from the latter into the channel may at any time be controlled through the window in the part 75a and through the transparent disc 75b. The magazine shaft 74 is driven by a gear wheel 91 fixed to it and by a rack 92 engaging the wheel 91. This rack 92 is in drive connection with a pin 93 of lever 13 carrying the roller 17. Pin 93 enters a longitudinal slot 92' of the rack 92 and is normally held in contact with the right end face of this slot by spring 94. The slot 92' permits the lever 13 to be moved for driving the working means connected to this lever when the magazine is in operation as well as when it is at rest, i. e. in the positions shown in Figs. 16, 18, and 20.

Figure 3:
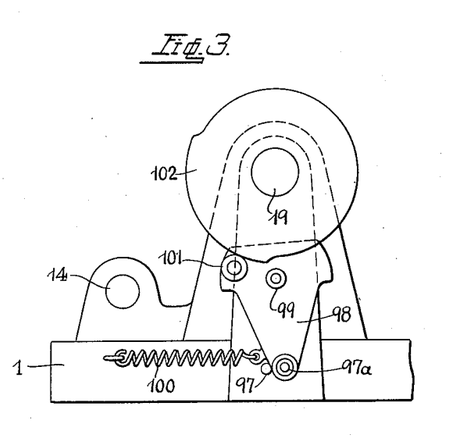
Fig. 3 shows details of a suction line control.
Figure 4:
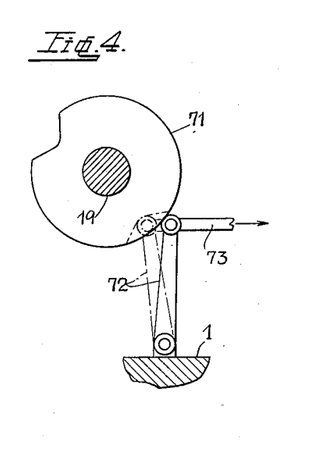
Fig. 4 illustrates the drive mechanism for a stone-centering device.
Figure 20:
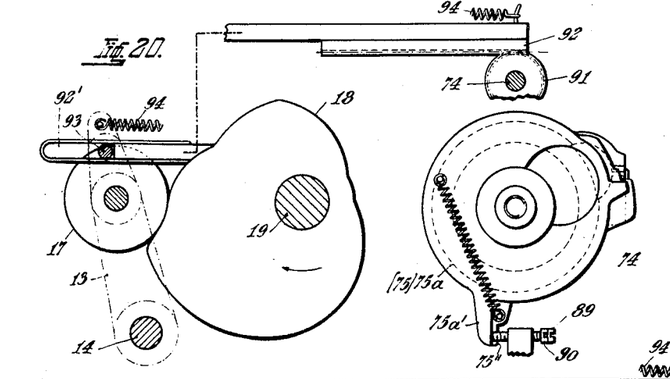
Figure 21:
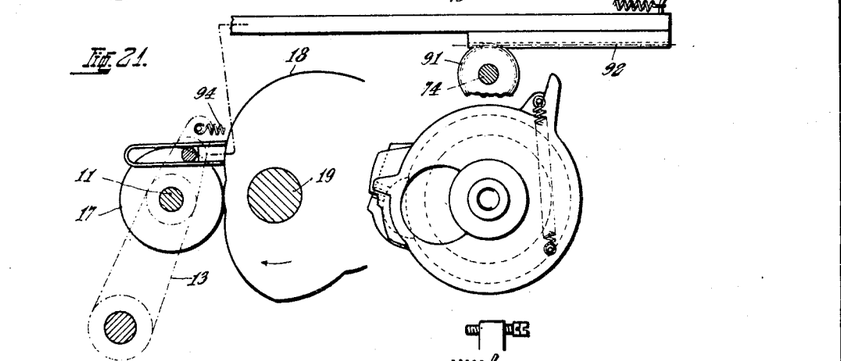
Figure 22:
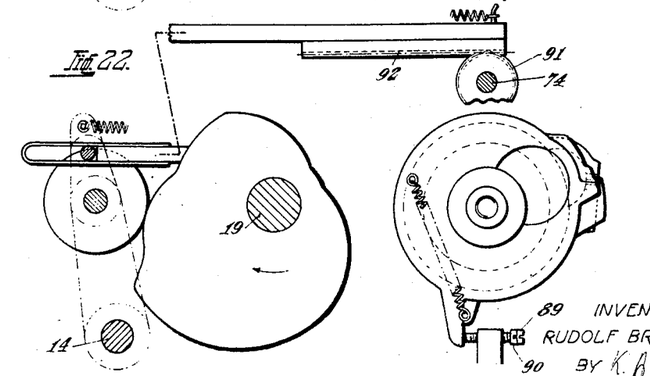

Removing the outermost bearing stone 5 from the channel 87 by the feeder 53 is carried out by suction effect. On the end opposite to the arm 55 the tube 54 is connected to a vacuum chamber 96 by means of a hose 95. This chamber is temporarily connected to a fan (not shown) through a conduit 97 and a control valve 98 (Fig. 3). The valve 98 is rotatable about a pin 99 (Fig. 3) and carries a roller 101 pressed by a spring 100 against the circumference of a cam disc 102 fixed to the shaft 19. Valve 98 driven by the disc 102 controls the inlet to suction line 97 which it connects with the vacuum source when a pipe socket 97a mounted on the valve 98 and in permanent connection with the vacuum source is brought in alignment with the suction line 97. This alignment is established as soon as the magazine has been moved from the position of Fig. 21 to the one of Fig. 22. Figs. 20, 21 and 22 show the mutual position of the magazine and the driving cam disc 18. In the position shown in Fig. 21 of the magazine 75, 75a, the roller 17 is in contact with a disc portion concentrical to the shaft 19. Therefore, the magazine comes to rest before it rotates backwards into the position of Fig. 22. This backward rotation takes place in two steps separated by a stoppage. During this latter period when the magazine is in the feed position (Fig. 20), the feeder 53 sucks the outermost stone from the channel 87 and returns together with the stone by a certain amount whereupon the magazine begins to rotate in the clockwise direction and the feeder 53 has free passage to the centering device 66—68. Immediately afterwards, the feeder 53 with the stone moves towards the centering device 66—68, i. e. from the position of Fig. 24 into the position of Fig. 25. However, if no stone has been sucked by the feeder, because the magazine is empty or the stones in the channel 87 are prevented from advancing for any reason, the following control device operates:

As shown in Figs. 13 and 14, the vacuum chamber 96 is closed at its top by a diaphragm 103 coupled by means of a draw-member 104 with an up- and down-moving arm 105 of a horizontal shaft 106. A spring 108 acting upon an arm 107 of the shaft 106 tends to hold an edge of the arm 105 in reach of a shoulder 54' on the end of the tube 54 (Fig. 24). If the feeder 53 has sucked a stone from the channel 87, a vacuum is produced in the chamber 96 which draws the diaphragm 103 downwards (Fig. 13), which by the member 104 moves the arm 105 out of reach of the tube 54 (Fig. 13) so that the arm 105 does not prevent the tube 54 from moving together with the feeder 53 towards the left in Fig. 24. However, if no stone has been sucked by the feeder, no vacuum occurs in the chamber 96, so that the arm 105 remains within reach of the tube 54 and prevents the latter and the feeder from being moved. Therefore, by this stoppage of the feeder disturbances are indicated. If the feeder is in the position of Fig. 25, i. e., if it carries a stone, this latter enters between the centering members 67 and 68 which, on their swinging towards each other, center the stone with regard to the feeder axis. After the centering members having been moved outwardly, the feeder with the centered stone moves onwards towards the end face provided with adhesive substance of the pin 4 actually held by the holder 31 lying opposite to the feeder. The stone having been applied and pressed to the pin 4, the suction effect is interrupted by the valve 98. Now, the stone adheres to the pin 4, and the feeder 53 goes back from the position of Fig. 26 to the initial position of Fig. 27.

The pins 4 provided with unpierced bearing stones run through the guide part 3b towards the top. Before reaching the outlet part 3c, a substance containing diamond dust is applied to the stones by the finger 52 fixed to the shaft 42, which takes the substance from a container 109 and brings it to the stone lying within reach of the finger. At this moment, the pin 4 is held by a fork-shaped holder 110 mounted on an adjustable arm 111 of a shaft 112 (Figs. 7, 8, 9), The latter carries an arm 114 pressed against the arm 38a by means of a spring 113. Arm 38a is controlled by the rod 9. On the rod 9 with the slide 8 going back into initial position behind the feed channel 3 (to the right in Fig. 9), holders or arresters 31 and 110 are taking their working position where they remain until the slide plate 8 has brought a pin 4 provided with adhesive substance close to the holder 31. Now, the holder 31 and together with it also the holder 110 are lifted, so that the slide 8 advances all the pins 4 in the guide 3a, 3b by one step. In order that the pins 4, on their advance, may not be displaced axially and are flush with one another, the back wall of the body 2 carries on a sally 2a a flat ledge 2a' engaging the flat recesses 4' of each pin 4 (Fig. 24). The ledge 2a' extends over the whole length of the guide 3a, 3b, 3c. The pins 4 leaving the guide outlet 3c arrive on the top of the upper wall of the body 2 where they may be taken by hand to be brought to stone-drilling machines.

Should it not be possible to remove the pins quickly enough from the upper body wall, the following stop device shown in Figs. 10 and 11 operates. A feeler rod 115 extending over the upper wall of the body 2 is longitudinally adjustable against the action of a spring and carries a stop 116 (Fig. 2). Now, if the foremost of the pins 4 ready for being removed strikes against the stop 116, it displaces the rod 115 which at the fore end (left in Fig. 1) is bent rectangularly twice downwards and forwards, and is articulated to an upwardly extending lever 118 of a shaft 117 (Fig. 1). This shaft carries a lever 119 which is shown separately in Fig. 11 and the free end of which is cranked outwardly. On one end of the shaft 19 (at the top in Fig. 2) a gear wheel 120 is loosely mounted, and, adjacent thereto, a ring 121 is fixed to the shaft 19. On two diametrically opposed pins 122 of the ring 121 a coupling lever 123 is articulated to swing laterally, which is pressed to the face of the gear wheel 120 by a leaf spring 124. This face of the gear wheel 120 comprises two radial grooves 125, one of which is normally engaged by a rib 126 projecting beyond the inner side face of the coupling lever 123 so that rotation of the gear wheel 120 is transmitted to the shaft 19 by the lever 123 and the ring 121. Coupling lever 123 also comprises a nose 127 contacted by lever 119 when the latter swings upwardly upon the rod 115 being displaced towards the right in Fig. 2. Thereby, the coupling lever 123 is disengaged from the gear wheel 120, and the latter runs idly, i. e. without driving the shaft 19. As soon as one or several pins 4 are removed from the place in front of the stop 116, the rod 115 returns under the influence of a spring 128 acting upon the lever 119 in downward direction. Then, lever 119 again releases coupling lever 123 which becomes again effective when its rib 126 engages one of the grooves 125. The gear wheel 120 is driven by a belt pulley 129 rotating a pinion 130 in mesh with the gear wheel 120.

The above described automatic machine for applying bearing stones to carrier pins or "coulants" works as follows:

On driving the belt pulley 129 the lowermost pin 4 in the feed channel 3 is pushed forward by the slide plate 8 along the stripper 28 under the lifted holder 31. If this pin 4 carries a pierced stone this latter is stripped off by the stripper 28. Immediately afterwards the finger 41 applies liquid adhesive substance to the free end face of the pin 4. Meanwhile the feeder 53 sucks a stone from the magazine 87, carries this stone between the centering members 67, 68 and, after the stone having been centered, presses this stone to the pin 4 held by the holder 31. At this moment suction effect of the feeder 53 is interrupted so that the stone adheres to the pin. The pins 4 carrying stones are then gradually advanced in the guide 3a, 3b. When they arrive within reach of holder 110 and finger 52 the stones are supplied with substance containing diamond dust whereupon the pins may be removed from the machine for piercing the stones.

In the described machine unpierced bearing stones are automatically applied to pins. Except the centering, this has hitherto been done by hand, so that by this machine the production rate is considerably increased.

What I claim is:

1. A machine for automatically applying unpierced bearing stones to carrier members comprising, in combination, stationary guide means for receiving and conducting a plurality of carrier members along a predetermined path, advancing means connected with said guide means for advancing the carrier members therein, means disposed adjacent to said guide means for applying an adhesive substance to said carrier members in said guide means, a stone applicator having a head portion adapted to hold individual stones, a mechanism moving said applicator to and from a carrier member in said guide means for applying stones individually to individual carrier members after adhesive substance has been applied to the latter, a stone magazine having stone release means, means oscillating said magazine for moving said release means into the path of said head portion for releasing individual stones to the latter for being held until they are applied to the carrier members, centering means, means moving said centering means into the path of said head portion for centering the stones on said head portion, and drive means for cooperatively operating said advancing means, said adhesive applying means, said mechanism, said magazine oscillating means, and said means moving said centering means.

2. A machine as defined in claim 1 comprising stripping means disposed adjacent to said guide means ahead of said means for applying an adhesive substance, for stripping stones from the advancing carrier members before said members reach said adhesive applying means.

3. A machine as set forth in claim 1, said head portion comprising an air intake nozzle and said machine comprising means connected with said nozzle for sucking air thereinto and holding individual stones on said nozzle by vacuum.

4. A machine as set forth in claim 1, said magazine having a container part having a rim portion disposed in a substantially vertical plane, a substantially horizontal shaft supporting said part, a cover adjacent to said rim portion for closing the container part and being rotatable relative to said part about the longitudinal axis of said shaft, said rim portion having a recess extending outwardly from the interior of said part for receiving stones from said part, and said cover having such configuration as to uncover a part of said recess upon relative movement of said part and said cover for providing access to one of the stones in said recess.

5. A machine for applying substantially cylindrical bearing stones to carrier members and as set forth in claim 4, said recess having a channel-like outer portion whose width is substantially equal to the diameter of the stones, said recess having a flat inner portion flaring from said outer portion to the interior of said part, and the depth of said recess being substantially equal to the length of the bearing members.

6. A machine as set forth in claim 1, said head portion comprising an air intake nozzle; and said machine comprising air suction means connected with said nozzle for sucking air thereinto and holding individual stones to said nozzle by vacuum, and valve means disposed in said suction means and connected with and actuated by said mechanism for interrupting suction of air after application of a stone to a carrier member.

7. A machine as set forth in claim 1, said head portion comprising an air intake nozzle, and said machine comprising air suction means connected with said nozzle for sucking air thereinto and holding individual stones to said nozzle by vacuum, lock means connected with said mechanism for interrupting movement of said head portion to a carrier member, and air pressure sensitive means connected with said suction means and with said lock means for actuating same when there is no vacuum due to the absence of a stone on said intake nozzle.

8. A machine as set forth in claim 1, said head portion comprising an air intake nozzle and said machine comprising means connected with said nozzle for sucking air thereinto and holding individual stones on said nozzle by vacuum, said centering means comprising a clamp having two prongs, one of said prongs having a roller mounted thereon and the other prong having a cut-out facing said roller and upon closing of the clamp receiving a stone held on said nozzle, and clamp opening and closing means connected with said clamp and with said drive means for actuation of said opening and closing means.

9. A machine as set forth in claim 8, said closing means consisting of a spring forcing the prongs together and said opening means comprising a two-arm lever connected with and oscillated by said drive means and disposed between said prongs for forcing them apart against the action of the spring.

10. A machine as defined in claim 1, comprising diamond dust applying means disposed adjacent to said guide means for applying diamond dust to the stones after they have been applied to the carrier members, said dust applying means being connected to and actuated by said drive means.

11. A machine as defined in claim 10, comprising arresting means disposed adjacent to said guide means for individually arresting carrier members moving past said diamond dust applying means, and a mechanism interconnecting said arresting means and said dust applying means for simultaneous operation of both.

12. A machine for automatically applying unpierced bearing stones individually to the end face of a cylindrical portion of longitudinal carrier members, comprising, in combination: guide means having a slot-shaped, substantially vertical intake portion for receiving carrier members with their longitudinal axes parallel to one another; said guide means having a substantially horizontal portion disposed substantially transversely to said intake portion and receiving carrier members by gravity therefrom; a reciprocatingly movable pusher member disposed in said horizontal portion for advancing the carrier members individually in said horizontal portion, means connected with said pusher member to move it reciprocatingly; adhesive applying means disposed adjacent to said guide means for applying an adhesive substance to the end faces of the carrier members; reciprocatingly movable arresting means disposed adjacent to said horizontal portion for individually arresting the carrier members therein, means for moving said arresting means; reciprocatingly movable stone applying means for applying stones individually to the end faces of the carrier members after the adhesive substance has been applied thereto, means reciprocatingly moving said stone applying means; said applying means having a head portion moving to and from the end face of a carrier member arrested in said horizontal portion and comprising holding means for holding a single stone and affording movement of the held stone laterally to the reciprocating motion of the head portion; stone centering means disposed in the path of said head portion for individually centering the stones thereon; a rotatably mounted stone magazine having a stone discharge portion and comprising oscillating means for moving said portion into and out of the path of said head portion and adapted to discharge individual stones to said holding means, and drive means connected with and operating, in timed relation, said moving means for the pusher member, said adhesive applying means, said means for moving said arresting means, said means for moving said stone applying means, said centering means, and said magazine oscillating means.

13. A machine as set forth in claim 12, said guide means comprising an outlet portion for removing the carrier members, said machine comprising a feeler disposed in the path of the carrier members leaving said outlet portion and adapted to be actuated by unremoved carrier members, a clutch interposed in said drive means and connected with said feeler for making said drive means ineffective upon actuation of said feeler.

RUDOLF BRÜGGER.

REFERENCES CITED

The following references are of record in the file of this patent:

UNITED STATES PATENTS

| Number | Name | Date |
| --- | --- | --- |
| 1,332,778 | Taylor et al. | Mar. 2, 1920 |
| 1,456,673 | Day | May 29, 1923 |
| 2,253,954 | Goddu | Aug. 26, 1941 |